Nov. 30, 1926.

W. C. TYLER

FLEXIBLE ROTARY SHAFT COUPLING

Filed Oct. 16, 1923

1,609,275

INVENTOR:
W. C. TYLER,
BY John O. Seifert
ATTORNEYS.

Patented Nov. 30, 1926.

1,609,275

UNITED STATES PATENT OFFICE.

WARREN C. TYLER, OF BENNINGTON, VERMONT, ASSIGNOR TO W. C. LIPE, INC., OF SYRACUSE, NEW YORK, A CORPORATION OF NEW YORK.

FLEXIBLE ROTARY-SHAFT COUPLING.

Application filed October 16, 1923. Serial No. 668,808.

This invention relates to means for coupling together a pair of rotary and axially arranged shafts, and it is the object of the invention to provide a flexible and yielding coupling for rotary shafts constructed and arranged to permit of a slight rotary movement of one shaft relative to the other shaft, to absorb any shocks transmitted to the shaft to which the driving means for the shafts is connected, and also eliminating vibration which may be caused by a load applied to the driven shaft, and to provide a coupling of this character which is simple and cheap in structure and efficient in use.

The present subject-matter of invention embodied in the aplication is for subject-matter described and claimed in and required to be divided out from my co-pending application Serial No. 420,337 for power transmission mechanism filed October 29th, 1920, which application has matured in Patent No. 1,470,947 issued October 16, 1923.

Figure 2:
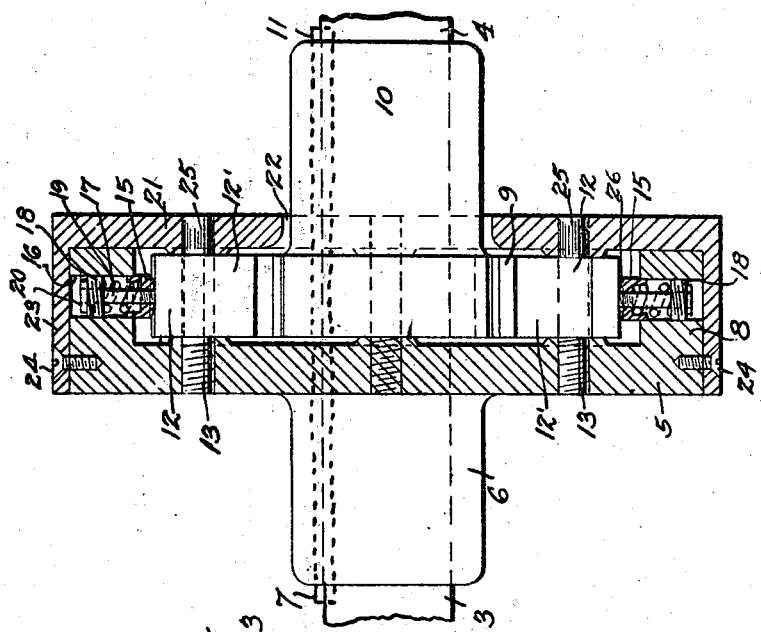
Figure 1:
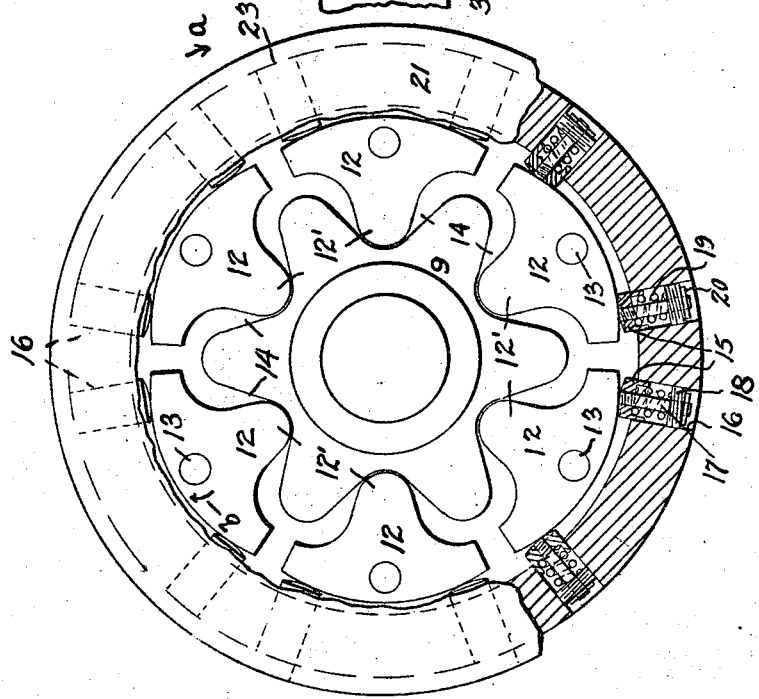

In the drawing accompanying and forming a part of this specification Figure 1 is an end elevation of a coupling illustrating an embodiment of my invention the same being partly broken away and partly in section to show the interior structure of the coupling; and Figure 2 is a cross sectional view.

Similar characters of reference designate like parts throughout the different views of the drawing.

In the embodiment of the invention shown in the drawing the coupling is applied to operatively connect a pair of shafts 3 and 4 to one of which shafts, such as the shaft 3, driving means, as an electric motor (not shown) is operatively connected, and to the other shaft 4 to which a driven element, such as a machine, not shown, may be connected.

The coupling comprises a head 5 in the form of a disk having a hub 6 whereby it is mounted upon the shaft 3 and fixed thereto as by a key 7. The disk 5 is arranged with an annular flange 8 at the peripheral portion to extend from the face of the disk opposite to the hub 6.

A spider or toothed wheel 9 has a hub 10 whereby it is mounted upon the shaft 4 and fixed to the latter as by a key 11. The shaft is arranged with the spider engaging within the disk flange 8 so that the latter will overhang the same, as clearly shown in Figure 2.

To operatively connect the shaft 3 with the shaft 4 a series of rockers 12, in the present instance shown as six in number, are circumferentially disposed about the disk 5 within the flange 8 and are pivotally supported upon studs 13 fixed in the disk, in the present instance by arranging the studs with screw threads at one end to engage in threaded openings in the disk. The rockers 12 are in the nature of sectors having a projection or tooth 12' extending radially inward to engage in the spaces between the arms of the spider 9 with a space or clearance between each of the teeth of the rockers and the arms of the spider in the normal inoperative position thereof, as shown at 14, the rockers being maintained in equilibrium by yielding or resilient plungers in the form of heads 15 slidably engaging in perforations 16 extending radially through the disk flange, said heads being attached to ends of stems 17 slidably engaging in collars 18 threaded into the perforations 16, the plungers being normally urged outward from the openings with the heads into engagement with the rockers 12 by springs 19 seated at one end in a recess in the rear of the heads and confined between said heads and the collars 18, the outward movement of the plungers being limited by nuts 20 threaded on to the stems 17 at the outer side of the collars. The equalizing plungers are arranged to engage the rockers at points equidistant from opposite sides of the supporting studs 13 for the rockers. The force with which the plungers engage the rockers and the extent to which the plungers are projected from the perforations 16 is controlled by the adjustment of the collars 18 into the perforations and the extent to which the nuts 20 are threaded on to the plunger stems 17.

To provide an enclosing housing for the spider and the rockers an annular cover or casing of angular shape in cross section is provided, one angle portion, as 21, of said closure engaging at the side of the spider and rockers opposite to the disk, and the opening 22 in said casing being of a size to permit of the free passage of the hub of the spider. The other angle portion, as 23, extends about and is in contiguous relation to the periphery of the disk flange 8, as clearly shown in Figure 2, and secured in position by screws 24. The portion 23 of the cover it will be noted also serves to close the outer ends of the plunger perforations 16 thereby preventing foreign substances from entering said perforations from the exterior of the coupling with the possibility of interfering with the proper functioning of the equalizing plungers. The cover is also arranged with perforations for the engagement and support of the extended ends of the rocker supporting studs 13, as shown at 25.

In operation, assuming that power is being applied to the shaft 3, the same to constitute the driving shaft, to rotate said shaft and the shaft 4, the latter constituting the driven shaft, in the direction indicated by the arrow $a$ in Figure 1, the teeth 12' of the rockers 12 will be brought into engagement with the arms of the spider, the shaft 3 having a slight rotative movement relative to the shaft 4, and the force of the power exerted on shaft 3 as the teeth of the sectors are brought into engagement with the spider will have a slight yielding lost motion about their pivot supports in the direction of the arrows $b$ against the force exerted on the sectors by the plungers at the left of the sector supporting studs as viewed from Figure 1 until the outer curved face or wall at the outer side of the pivot support of the sectors comes into engagement with the inner circumferential wall of the disk flange 8, the outer wall of the sectors being in slight spaced relation to said inner wall of the disk flange to permit of this rocking movement of the sectors. As the said portion of the rockers or sectors come into engagement with the inner wall of the disk flange any further force exerted upon the rockers by the shaft 3 will revolve or turn the spider therewith and thereby rotate the shaft 4 and any driven element connected thereto. As power is applied to the shaft 3 to rotate the same in a direction reverse to that above described and indicated by the arrow $a$ the rockers will have a slight lost motion in a direction reverse to that indicated by the arrow $b$ with that portion of the rockers at the right of their pivotal support, as viewed in Figure 1, and such movement yieldingly resisted by the plungers 15 at said side of the rocker supports.

By the arrangement of the mounting of the rockers or sectors 12 a flexible and yielding coupling is provided between the shafts 3 and 4 and any shocks which would ordinarily be transmitted to shaft 3 as it is coupled to shaft 4 are absorbed by the yielding plungers 15, these plungers also absorbing and eliminating any vibration or chatter which may be caused by the load, such as a machine, as it is connected to the shaft 3. The plungers also serve to hold the teeth of the sectors in engagement with the spider arms and thereby eliminate any possibility of backlash.

Having thus described my invention, I claim:

1. In a coupling for rotary shaft sections, a spider adapted to be fixed to one shaft section, sectors pivotally carried by and circumferentially disposed about the other shaft section to have movement on axes parallel with the shaft sections, each sector having a tooth intermediate the ends and extending radially inward from the pivotal support thereof to co-operate with the spider to couple the shaft sections together, and means to exert a yielding force upon the sectors at the opposite sides of and in a direction transverse to the axis of the sector supports.

2. In a coupling for rotary shafts, a head having a flange at the periphery adapted to be fixed to a shaft, rockers pivotally carried by and circumferentially disposed about said head in equidistant spaced relation to have movement on axes parallel with the axis of the head, each rocker having a tooth extending radially inward from the pivotal support thereof, and means carried by the head flange to engage and exert a yielding force upon said rockers at opposite sides of the pivotal supports thereof.

3. In a coupling for rotary shafts, a head adapted to be fixed to a shaft having an annular flange at the peripheral portion, rockers pivotally carried by and circumferentially disposed about said head within the flange to have movement on axes parallel with the axis of the head each rocker having a tooth extending radially inward from the pivotal supports thereof, spring influenced abutments carried by said flange to engage with and exert a yielding force upon the rockers at opposite sides of and in a direction transverse to the axis of the pivotal supports of the rockers, and a spider adapted to be fixed to another shaft in axial relation to the first shaft to be engaged within the head flange in concentric and co-operative relation to said rockers with the rocker teeth disposed between the arms of the spider to couple the shafts together.

4. In a coupling for rotary shafts, a head adapted to be fixed to a shaft having an annular flange; toothed sectors pivotally carried by and circularly disposed about the head within the flange; plungers slidably mounted in perforations in the flange at opposite sides of the pivotal supports of the sectors and yieldingly urged into engagement with the sectors; and a spider fixed on another shaft in concentric relation to the sectors with the teeth of the sectors loosely engaging in the spaces between the arms of the spider for the purpose specified.

5. In a coupling for rotary shafts, the combination with a pair of shafts, of a spider fixed to one of said shafts, and toothed sectors yieldingly supported by the other shaft, said sectors being circularly disposed in concentric relation to the spider with the teeth of the sectors engaging in the spaces between the spider arms.

6. In a coupling for rotary shafts, the combination with a pair of shafts, of a spider fixed to one of said shafts; a head fixed to the other shaft having an annular flange in concentric and spaced relation to the spider; pivotally supported toothed sectors circularly disposed about the head between the flange and spider with the teeth engaging in the spaces between the arms of the spider; plungers slidably mounted in perforations in the head flange at opposite sides of the pivotal supports of the sectors; and springs to yieldingly urge said plungers outward into engagement with the sectors.

7. In a coupling for rotary shafts, the combination with a pair of shafts, of a spider fixed to one of said shafts; a disk fixed to the other shaft having an annular flange arranged in spaced and concentric relation to the spider; toothed sectors pivotally carried by the disk and circularly disposed about the same within the space between the disk flange and spider with the teeth of the sectors engaging in the spaces between the arms of the spiders and the outer wall thereof in spaced relation to the inner wall of the disk flange; plungers slidably engaging in perforations in the disk flange at opposite sides of the pivotal supports of the sectors; and springs to yieldingly urge said plungers into engagement with the sectors.

8. In a coupling for rotary shafts, the combination with a pair of shafts, of a spider fixed to one of said shafts; a disk fixed to the other shaft having an annular flange arranged in spaced and concentric relation to the spider; toothed sectors pivotally carried by the disk and circularly disposed about the same within the space between the disk flange and spider with the teeth of the sectors engaging in the space between arms of the spider; spring influenced plungers slidably mounted in perforations in the disk flange at opposite sides of the pivotal supports of the sectors and yieldingly urged into engagement with said sectors; and a closure for the space between the disk flange and spider to enclose the sectors and the connection thereof with the spider.

Signed at Bennington, in the county of Bennington and State of Vermont this 12th day of October, 1923.

WARREN C. TYLER.